US008980199B2

(12) United States Patent
Imran

(10) Patent No.: US 8,980,199 B2
(45) Date of Patent: *Mar. 17, 2015

(54) MICRO-FLUIDIC DEVICE

(71) Applicant: InCube Labs, LLC, San Jose, CA (US)

(72) Inventor: Mir Imran, Los Altos Hills, CA (US)

(73) Assignee: InCube Labs, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,548

(22) Filed: Mar. 25, 2014

(65) Prior Publication Data
US 2014/0206076 A1    Jul. 24, 2014

Related U.S. Application Data

(63) Continuation of application No. 13/858,678, filed on Apr. 8, 2013, now Pat. No. 8,709,357, which is a continuation of application No. 13/448,235, filed on Apr. 16, 2012, now Pat. No. 8,414,849, which is a
(Continued)

(51) Int. Cl.
*F04F 5/48*    (2006.01)
*B01L 3/00*    (2006.01)
(Continued)

(52) U.S. Cl.
CPC ......... *B01L 3/50273* (2013.01); *B01J 19/0093* (2013.01); *F04B 19/006* (2013.01); *B01J 2219/00783* (2013.01);
(Continued)

(58) Field of Classification Search
USPC ............... 137/565.11, 565.01, 147, 454.4, 137/565.22; 422/502, 500, 501, 505, 507, 422/516, 509
See application file for complete search history.

(56) References Cited

U.S. PATENT DOCUMENTS 6,071,081 A   6/2000 Shiraishi
6,520,197 B2  2/2003 Deshmukh et al.
(Continued)

FOREIGN PATENT DOCUMENTS

WO    WO 98/07069      2/1998
WO    WO 2010/025046   3/2010

OTHER PUBLICATIONS

International Search Report and Written Opinion issued in Int'l Application PCT/US2009/053291, dated Mar. 22, 2010, 12 pgs.
(Continued)

*Primary Examiner* — In Suk Bullock
*Assistant Examiner* — Sharon Pregler
(74) *Attorney, Agent, or Firm* — Mahamedi Paradice, LLP

(57) ABSTRACT

Embodiments described herein provide micro-fluidic systems and devices for use in performing various diagnostic and analytical tests. According to one embodiment, the micro-fluidic device includes a sample chamber for receiving a sample, and a reaction chamber for performing a chemical reaction. A bubble jet pump is structured on the device to control delivery of a fluid from the sample chamber to the reaction chamber. The pump is fluidically coupled to one or more chambers of the device using a fluidic channel such as a capillary. A valve may be coupled to one or more chambers to control flow into and out of those chambers. Also, a sensor may be positioned in one or more of the chambers, such as the reactant chamber, for sensing a property of the fluid within the chamber as well as the presence of a chemical within the chamber.

20 Claims, 4 Drawing Sheets

Related U.S. Application Data continuation of application No. 12/541,797, filed on Aug. 14, 2009, now Pat. No. 8,158,082.

(60) Provisional application No. 61/093,283, filed on Aug. 29, 2008.

(51) Int. Cl.
 *B01J 19/00* (2006.01)
 *F04B 19/00* (2006.01)

(52) U.S. Cl.
 CPC ............... *B01J 2219/00869* (2013.01); *B01J 2219/00873* (2013.01); *B01J 2219/00891* (2013.01); *B01J 2219/00961* (2013.01); *B01J 2219/00966* (2013.01); *B01J 2219/00981* (2013.01); *B01J 2219/00986* (2013.01); *B01L 2300/022* (2013.01); *B01L 2300/0816* (2013.01); *B01L 2300/0867* (2013.01); *B01L 2300/1827* (2013.01); *B01L 2400/0442* (2013.01); *B01L 2400/049* (2013.01); *B01L 2400/0605* (2013.01)

USPC .......... 422/505; 422/502; 422/504; 422/500; 417/209; 137/565.11; 137/565.01

(56) References Cited

U.S. PATENT DOCUMENTS

| | | | |
|---|---|---|---|
| 8,158,082 B2* | 4/2012 | Imran | 422/505 |
| 8,414,849 B2* | 4/2013 | Imran | 422/505 |
| 8,709,357 B2 | 4/2014 | Imran | |
| 2002/0114739 A1 | 8/2002 | Weigl et al. | |

OTHER PUBLICATIONS

International Preliminary Report on Patentability as issued in Int'l Application PCT/US2009/053291 dated Mar. 10, 2011.

Kim, "The development of the lab on a chip with the bubble jet type micropump for PCR process with using the MEMS technology", Department of Mechanical-Mechatronics, Engineering Graduate School, Kangwon National University, Feb. 2004.

Tsai, Jr-Hung et al., "A Thermal-Bubble-Activated Micronozzle-Diffuser Pump", Journal of Microelectromechanical Systems, vol. 11, No. 6, Dec. 2002.

\* cited by examiner

MICRO-FLUIDIC DEVICE

RELATED APPLICATIONS

This application is a Continuation of U.S. patent application Ser. No. 13/858,678 entitled MICRO-FLUIDIC DEVICE, filed Apr. 8, 2013, which is a Continuation of U.S. patent application Ser. No. 13/448,235 entitled MICRO-FLUIDIC DEVICE, filed Apr. 16, 2012 and issued as U.S. Pat. No. 8,414,849 on Apr. 9, 2013, which is a Continuation of U.S. patent application Ser. No. 12/541,797 entitled MICRO-FLUIDIC DEVICE, filed Aug. 14, 2009 and issued as U.S. Pat. No. 8,158,082 on Apr. 17, 2012, which claims benefit of priority to Provisional U.S. Patent Application No. 61/093,283, entitled MICRO-FLUIDIC DEVICE, filed Aug. 29, 2008; all of the aforementioned priority applications being hereby incorporated by reference in their respective entirety for all purposes.

BACKGROUND

FIELD OF THE INVENTION

Embodiments described herein relate to micro-fluidic devices. More specifically, embodiments relate to micro-fluidic devices having a bubble jet pump.

DETAILED DESCRIPTION

Embodiments described herein provide micro-fluidic systems and devices for use in performing various diagnostic tests. Many embodiments employ a bubble jet based pump as a mechanism for precisely controlling the flow of fluids within the device, including the introduction of fluids into one or more reaction chambers disposed within the device. Such embodiments allow for the precise control of: (i) the introduction of a sample fluid into a reaction chamber, and/or (ii) sequenced or timed introduction of one or more reactants for the sample fluid to allow for a chemical reaction to occur in the chamber. Such chemical reactions can be used to perform medical diagnostic tests or assays, including those used for colorometric assays and immunoassays including enzyme-linked immunosorbent assay (ELISA) and other immuno-based assays known in the art.

Embodiments described herein provide micro-fluidic systems and devices for use in performing various diagnostic tests. Embodiments of the device can include one or more chambers to enable receiving and reaction of fluid samples used in performing a diagnostic test. According to one embodiment, the micro-fluidic device includes a sample chamber for receiving a sample, and a reaction chamber for performing a chemical reaction. A bubble jet pump is structured on the device to control delivery of a fluid from the sample chamber to the reaction chamber. The pump is fluidically coupled to one or more chambers of the device using a fluidic channel such as a capillary. A valve may also be coupled to one or more chambers to control flow into and out of those chambers. Additionally, a sensor may be positioned in one or more of the chambers, such as the reactant chamber, for sensing a property of the fluid within the chamber as well as the presence of a chemical within the chamber.

Further details of these and other embodiments of micro-fluidic systems and devices are described more fully below with reference to the attached figures.

Figure 1:
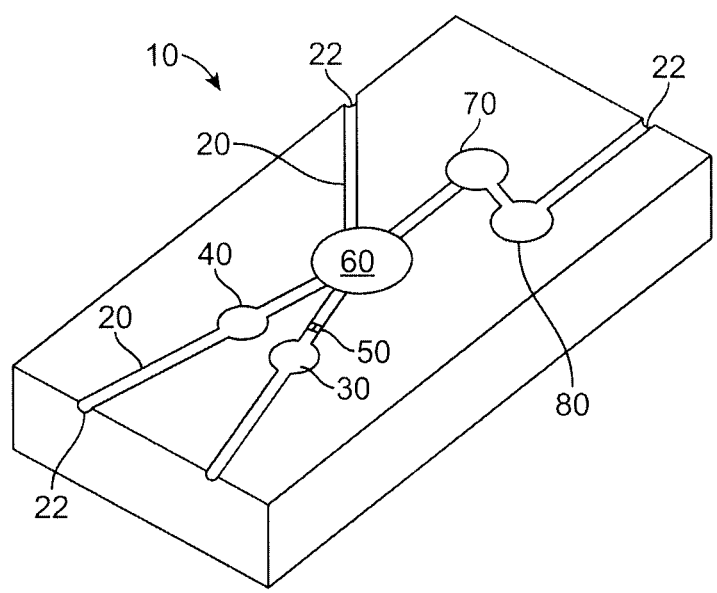
FIG. 1 is a perspective view illustrating an embodiment of a micro-fluidic device including a bubble jet based pump.
Figure 2:
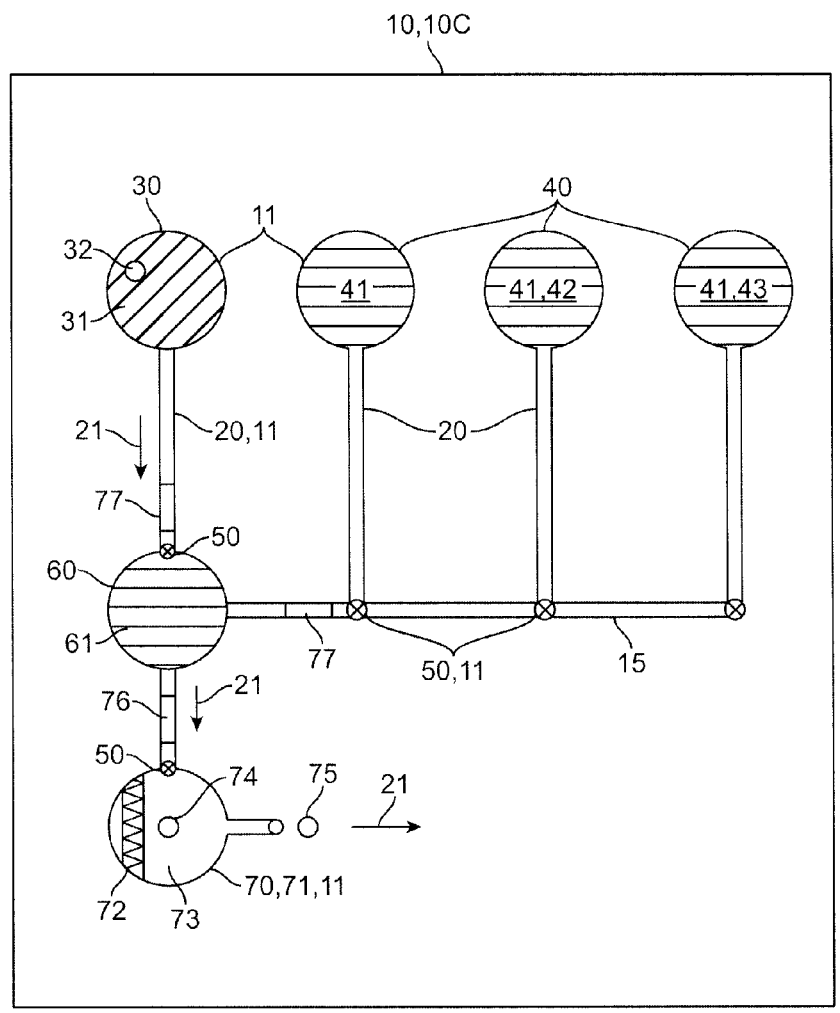
FIG. 2 is a schematic view illustrating an embodiment of a micro-fluidic circuit including a bubble jet based pump.
Figure 3:
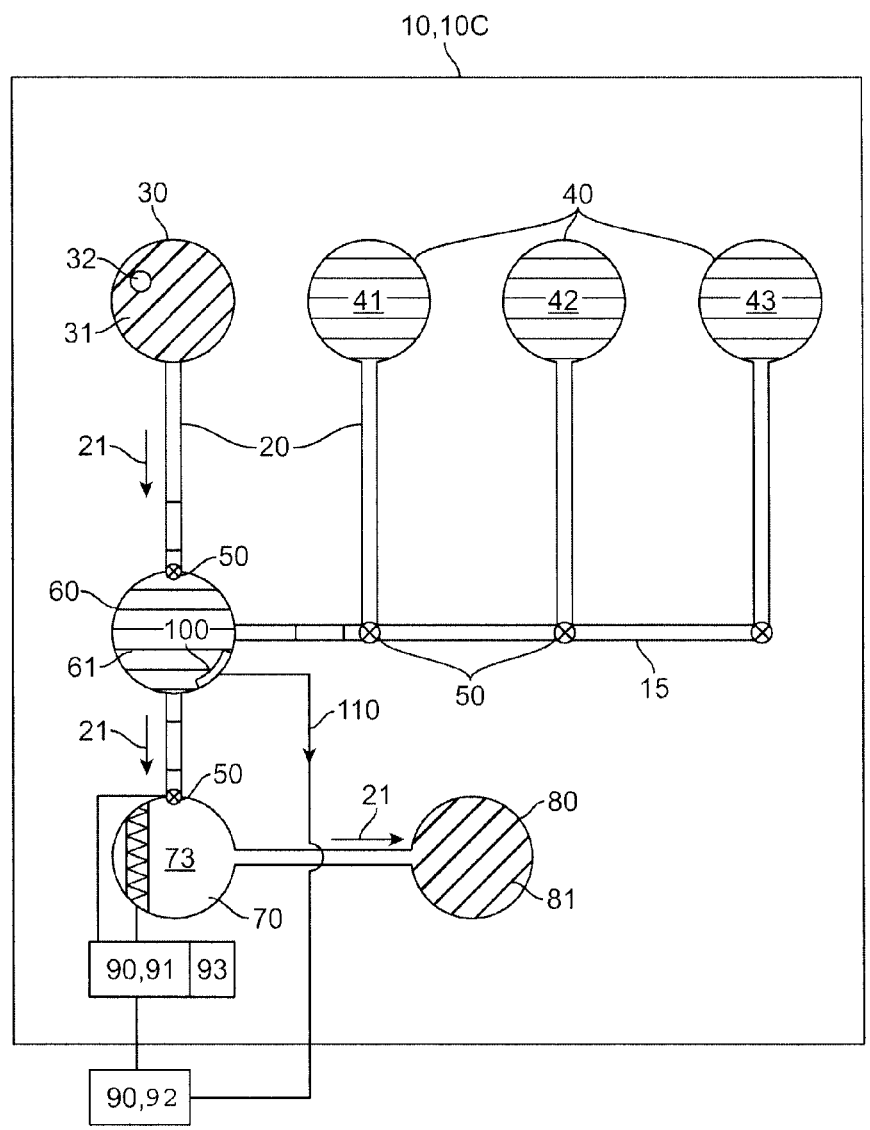
FIG. 3 is a schematic view illustrating another embodiment of a micro-fluidic circuit including a bubble jet based pump, controller and other components.
Figure 4:
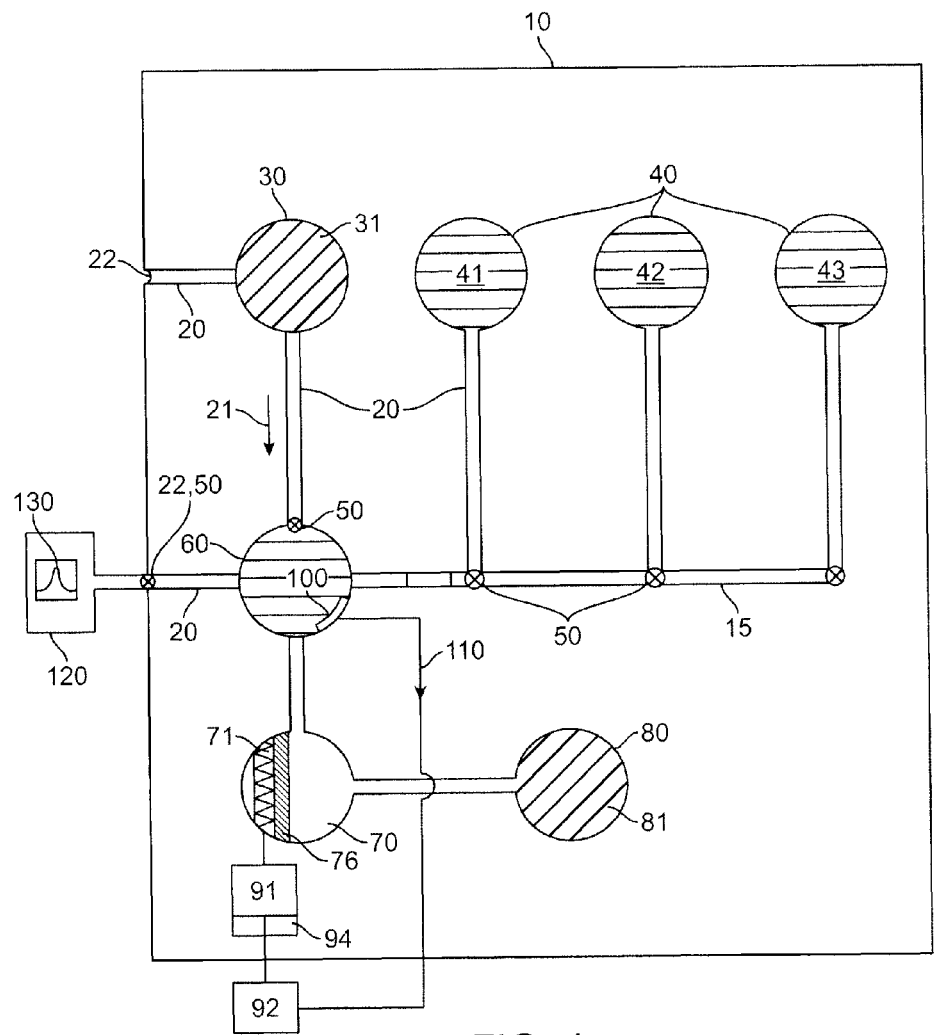
FIG. 4 is a schematic view illustrating another embodiment of a micro-fluidic circuit including a bubble jet based pump that is configured to be coupled to an external analytical device.

Referring now to FIGS. 1-4, an embodiment of a micro-fluidic device 10 can include one or more micro-fluidic features 11 for performing one or more functions on the device. Such features 11 can include fluidic channels 20, ports 22, a sample chamber 30 (which may containing a test sample 31), one or more reactant chambers 40 containing one or more reactants 41, 42, 43, a pump 70 and a collection chamber 80 for collection of fluid 81. Fluidic channels 20 provide a pathway on the micro-fluidic device 10 in which a fluid can flow between or among various chambers, pumps, ports and other features 11 on the micro-fluidic device 10. One or more features 11 can be arranged to form a micro-fluidic circuit 15. FIG. 2 illustrates an embodiment of a micro-fluidic circuit 15. Other arrangements or configurations for micro-fluidic circuits 15 may also be provided.

Micro-fluidic device 10, including one or more features 11, can be formed on a variety of substrates including silicon as well as polymer based substrates using etching and/or lithographic processes known in the art. Suitable polymers include elastomeric polymers such as silicone. Typically, micro-fluidic device 10 will comprise a micro-fluidic chip 10C that is configured to engage or otherwise be coupled to one or more medical diagnostic or analytical instruments. However, other micro-fluidic devices are also contemplated. For example, micro-fluidic device 10 can comprise a micro-fluidic column or other separation device that mates with a medical diagnostic or analytical instrument. Alternatively, micro-fluidic device 10 can be a stand alone device such as a lab-on-a-chip that needs no external connections and can even include its own power source, such as a miniature lithium battery (e.g., a button battery) or other miniature battery.

Ports 22 are coupled to channels 20 and provide a pathway for the flow of fluid in and/or out of micro-fluidic device 10. Typically, micro-fluidic device 10 will include at least one inlet and outlet port 22, but can have one or the other, or none. Multiple inlet and outlet ports 22 are also contemplated to allow for the inflow and outflow of multiple fluids and/or parallel fluid flow of the same or different fluids.

In one embodiment, channels 20 can include one or more valves 50 to control the flow of fluid into and out of various chambers and other features 11 on the micro-fluidic device 10, as well as the direction 21 of fluid flow. Valves 50 can also be positioned at or integral to chambers 30, 40, 60 and 80, as well as pump 70. They can also be positioned at ports 22. In various embodiments, valves 50 can comprise one or more of an electronically, pneumatically, pressure or magnetically actuatable valve. Valves 50 can be one-way or two-way, and can be controlled electronically by means of a controller 90, such as a microprocessor. In one embodiment, a valve 50 can comprise a pressure operated check valve. The cracking pressure of the valve 50 can be selected for the particular pressure generated by pump 70.

In many embodiments, pump 70 comprises a bubble jet pump device 71. In one embodiment, the bubble jet pump device 71 includes a heating element 72 that is used to controllably heat liquid within the pump chamber 73 to form a vapor bubble 74 which forces out a jet of a fixed volume of liquid 75. Bubble jet pump device 71 can be similar to ink jet/bubble jet devices used in ink jet printers. However, according to one or more embodiments, bubble jet pump device 71 is adapted to function as a vacuum pump to controllably pull in a selected volume of fluid into reaction chamber 60 or other feature 11, rather than eject or deposit fluid onto a surface. Heating element 72 can comprise a resistive/joulean heating element, but other heating elements are also contemplated including, RF, microwave, acoustic, infrared and gas elements. The ejected volume of liquid 75 (also known as drop size 75) creates vacuum pressure which pulls a fixed volume of fluid 76 from reaction chamber 60 and in turn, a fluid volume 77 drawn into the chamber from either sample chamber 30, reactant chamber 40 or other feature 11. The volume of drawn fluid 77 can be controlled by controlling the drop size 75. The drop size 75 can be controlled by using various methods known in the bubble jet arts including controlling one or more of the power, duration and duty cycle of heating from heating element 72. Other methods of controlling drop size 75 are also contemplated. For example, drop size 75 can be controlled through use of control valve 50 alone or in combination with other methods described above.

In various embodiments, heating element 72 can include an overlying hydrogel or other water containing polymer layer such that the vapor bubble 74 is derived from a phase change of water contained in the hydrogel layer rather than from fluid within chamber 73. In this way, fluid within chamber 73 is thermally shielded from direct contact with heating element 72 while still allowing for the ejection of fluid from pump chamber 73 and pump 71. The hydrogel layer can be configured to have a sufficient amount of trapped water or an aqueous based solution to allow for multiple firings of pump 71.

In the embodiment shown in FIG. 2, a single bubble jet pump 71 is shown to be coupled with reaction chamber 60. However in various embodiments, multiple bubble jet pumps 71 may be used. For example, each reactant chamber 40 can have its own bubble jet pump 71 in order to simultaneously (or close to simultaneously) enable or cause mixing of test sample 31 and reactants 41 in the reaction chamber 60. Other combination for connecting bubble jet pumps 71 to one or more features 11 are also contemplated. For example, bubble jet pump 71 can be coupled to an inlet port 22 to pull a sample fluid 31 into micro-fluidic device 10 from an external source.

In many embodiments, bubble jet pump(s) 71 including heating element 72 are electronically coupled to a controller 90, which can either be a device resident controller 91 or an external controller 92 or both. Heating element 72 and/or controller 91 can also be configured to enable wireless communication capabilities with an external controller or monitoring device 92, including RF communications, such as provided by standards such as BLUE TOOTH or WIRELESS USB. Controller 90 can comprise a microprocessor, a state device or analog control circuit. Controller 90 can also be coupled to one or more control valves 50 to control the sequence and timing of fluid delivery from sample chamber 30 and reactant chambers 40.

In particular embodiments, bubble jet pump 71 is configured to pull a controlled volume of fluid 77 into reaction chamber 60 from one or more of sample chamber 30, reactant chamber(s) 40 or other device feature 11. The amount of fluid drawn is selectable using techniques described above or other techniques known in the art. In various embodiments, the volume of drawn fluid 76 can be controlled using controller 90. Different controlled volumes 77 can be selected from sample chamber 30 and each reactant chamber 40. Controller 90 can contain one or more algorithms 93 which include a group and sequence of selected volumes 77 that are pulled from chambers 30 and 40 or other feature 11 depending on an analytical test to be performed within reaction chamber 60. Algorithms 93 can also include a sequence of valve operations for opening and closing control valves 50 to control the sequence of fluid delivered from chambers 30, 40 or other feature 11. Algorithms 93 can be preprogrammed on controller 90 or can also be signaled to controller 90 from an external controller using RF or other signaling method. In various embodiments, resident controller 91 can incorporate an RF ID tag or like device 94 for communication with external controller 92. RF ID tag 94 can also be a separate device that is positioned at selectable location on device 10.

In one embodiment, reaction chamber 60 is configured to allow for the mixing of sample 31 with one or more chemical reactants 41 so as to have a chemical reaction take place in the chamber to produce a product solution 61. Product solution 61 can have a particular property, such as a color, pH, etc., which allows for the detection and/or quantification of a particular analyte 32 in sample 30 (for example, a serum antibody such as the HIV antibody, or an analyte such as blood glucose, cholesterol (e.g., HDL, LDL), lipids, or a particular drug). In another embodiment, reactants 41 and reaction chamber 60 can be configured for performing a hematocrit or blood iron concentration test using analytical methods known in the art (e.g., a serum ferritin test as known in the art). Accordingly, in various embodiments, reaction chamber 60 can include one or more sensors 100 to allow for the detection/quantification of product solution 61, including solutions for measuring hematocrit and/or blood iron. The sensor 100 can be an optical sensor including a detector and emitter for doing various spectrometric measurements of solution 61. The emitter can use wavelengths configured to produce fluorescence in solution 61 (for example, to allow for the detection of an antibody containing a fluorescent compound or the presence of the heme molecule in blood). The emitter and detector can also be configured for performing various reflectance and absorbance measurements known in the art for detecting colorometric reactions in solution 61, such as those used for the detection of blood glucose. In such embodiments, the emitter and detector can be offset a selectable distance and angle to allow for reflectance and/or absorbance measurement. In other embodiments, sensor 100 can be a pH sensor, temperature sensor, gas (e.g., $O_2$) sensor, flow sensor or other sensor known in the sensor art. Multiple sensors 100 can also be employed and placed in multiple locations in reaction chamber 60, reactant chamber 40 or in other features 11 to allow for multiple measurements in multiple locations on device 10. Embodiments having multiple sensors 100 can allow for improved real time control of the tests performed by device 10.

In one embodiment, sensor 100 is configured to send a signal or input 110 to controller 90 (e.g., either controller 91 or 92), which can be used for detection and/or quantification of analyte 32. In addition, Signal 110 can be used for monitoring the progress of the chemical reaction in reaction chamber 60. Signal 110 can also be used by controller 90 to control the sequence of the introduction of sample, reactant and other fluids into and out of reaction chamber 60 or other features 11. In particular embodiments, signal 110 is used to control the actuation of bubble jet pump(s) 71.

In other embodiments, micro-fluidic device 10 can be configured to be coupled to an external analytical device 120, such as a spectrophotometer, which generates a detection peak or waveform characteristic 130 of a particular analyte 32. Coupling the external device 120 to device 10 can be achieved through the use of port 22 and/or valve 50.

Embodiments of the micro-fluidic device 10 can be used in conjunction with a variety of systems. These systems can include a variety of micro-fluidic systems including, without limitation, micro-fluidic chips, micro-fluidic lab-on-chip devices, ELISA devices, electrophoresis devices, chromatography devices, micro-arrays, micro-fluidic columns and other like devices.

In various embodiments of methods of using device 10, one or more of sample chamber 30, reaction chamber 60 and connecting channels 20 can initially contain air. Also, reactant chambers 40 can be pre-primed with reactants 41, or reactants 41 can be added to the reactant chambers 40 (e.g., by using an automated device). The user can also add sample 31 to sample chamber 30 by using a pipette or a similar device, or enable sample 31 to be added to the sample chamber 30 by using an automated device. When pump 71 is first actuated, it serves to evacuate all of the air from the connecting channel 20 and reaction chamber 60, and draw in a fixed amount of fluid sample 31 from the sample chamber 30. This allows reaction chamber 60 to be kept in a dry condition (in such embodiments, reaction chamber 60 may contain one or more dry reactants 40). A control valve 50 connecting the reaction chamber 60 with the sample chamber 30 can then be closed, and another control valve 50 can be opened to connect the reaction chamber 60 to a reactant chamber 40 that contains a reservoir of chemical reactant 41 (such as an antibody or enzyme). The pump 70 is then actuated again, thereby drawing in a fixed amount of reactant 41. This process can then be continued with one or more other reactant reservoir chambers with the volume and time sequence of each added reactant being controlled via the bubble jet pump and a signal from the controller. Different volumes can be selected for different reactants with a fixed time interval between additions to allow for mixing and subsequent chemical reaction in the reaction chamber.

The reaction chamber 60 can be configured to perform various diagnostic tests such as ELISA (or other antibody based test) or a blood iron concentration test, such as a serum ferritin test. Also, the reaction chamber 60 can include various optical emitters and detectors (such a photomultiplier tube) to detect the presence of one or more products from the chemical reaction using spectro-photometric methods known in the art.

The foregoing description of various embodiments of the invention has been presented for purposes of illustration and description. It is not intended to limit the invention to the precise forms disclosed. Many modifications, variations and refinements will be apparent to practitioners skilled in the art. For example, the micro-fluidic device can have multiple reaction chambers with multiple bubble jet pumps allowing for the performance of multiple tests one device. Also, the micro-fluidic device can be constructed in a modular fashion to allow particular features to be selected and assembled by the user.

Elements, characteristics, or acts from one embodiment can be readily recombined or substituted with one or more elements, characteristics or acts from other embodiments to form numerous additional embodiments within the scope of the invention. Moreover, elements that are shown or described as being combined with other elements, can, in various embodiments, exist as standalone elements. Hence, the scope of the present invention is not limited to the specifics of the described embodiments, but is instead limited solely by the appended claims.

What is claimed is:

1. A micro-fluidic device for performing a diagnostic or analytical test, the device comprising:
    a first chamber;
    a second chamber; and
    a bubble jet vacuum pump structured to control delivery of a fluid from the first chamber to the second chamber by pulling under vacuum, a selected volume of fluid into the second chamber wherein another volume of fluid is ejected from a fluidic circuit including the bubble jet vacuum pump so as to create the vacuum.

2. The device of claim 1, wherein the bubble jet vacuum pump is coupled to the second chamber by a fluidic channel.

3. The device of claim 2, wherein the fluidic channel is a capillary.

4. The device of claim 1, further comprising at least one valve fluidically coupled to at least one of the first chamber, the second chamber or the bubble jet vacuum pump.

5. The device of claim 1, wherein the first chamber comprises a sample chamber for receiving a sample.

6. The device of claim 1, wherein the second chamber comprises a reactant chamber for containing a reactant.

7. The device of claim 6, wherein the reactant chamber includes a pre-added reactant.

8. The device of claim 1, wherein the micro-fluidic device comprises a micro-fluidic chip, a micro-fluidic cartridge or a micro-fluidic separation device.

9. The device of claim 1, wherein the bubble jet vacuum pump includes a heating element.

10. The device of claim 9, wherein the heating element is a resistive, acoustic, RF, or optical heating element.

11. The device of claim 1, further comprising a controller electrically coupled to the bubble jet vacuum pump.

12. The device of claim 11, wherein the controller includes an algorithm for controlling an operation of the micro-fluidic device.

13. The device of claim 12, wherein the algorithm includes a sequence of valve operations for controlling a sequence of fluid flow between chambers of the device.

14. The device of claim 1, further comprising a sensor positioned in one of the first chamber, the second chamber or the bubble jet vacuum pump.

15. The device of claim 14, wherein the sensor is an optical, thermal, pH or gas sensor.

16. The device of claim 14, wherein the sensor is configured to detect an analyte, a metabolic analyte, a heme molecule, hematocrit, iron, a drug, an antibody, a bacteria or a virus.

17. The device of claim 14, wherein the sensor is configured to signal an input to a controller.

18. The device of claim 17, wherein the sensor signals the input using an RF signal.

19. The device of claim 1, further comprising an RF device, or RF ID tag coupled to the device for signaling data to an external receiver or monitoring device.

20. The device of claim 1, further comprising a port fluidically coupled to one of the first chamber, the second chamber or the bubble jet vacuum pump for the flow of fluid on and off the microfluidic device.

* * * * *